United States Patent Office 3,029,261
Patented Apr. 10, 1962

3,029,261
STEROIDAL FLUORO COMPOUNDS AND PROCESS FOR THE PRODUCTION THEREOF
Fred A. Kincl, Mexico City, Mexico, assignor to Syntex, S.A., Mexico, D.F., Mexico, a corporation of Mexico
No Drawing. Filed Nov. 30, 1959, Ser. No. 856,009
15 Claims. (Cl. 260—397.4)

The present invention relates to a novel process for producing cyclopentanophenanthrene derivatives. More specifically, it relates to a new process for introducing a fluorine atom into cyclopentanophenanthrene derivatives, as well as to certain novel compounds produced by the process of the present invention.

It is well known that the introduction of a fluorine atom into the cyclopentanophenanthrene molecule, especially into compounds of the androstane and pregnane series, increases the biological activity of the resulting fluoro analogs. The known methods of introducing a fluorine atom, more particularly in cases which involve substitution of an alcoholic function for a fluorine, comprise, for example the conversion of the steroid alcohol to a sulfonic acid ester, such as a tosylate, the conversion of the latter into the corresponding iodide, and finally the treatment of the iodo derivative with silver fluoride to replace the iodine by a fluorine atom; the British Patent No. 809,493, for instance, describes the production of 21-fluoro pregnane derivatives by this method.

The present invention is based on the surprising discovery that a treatment of primary steroid alcohols with a fluoride of aryl, aralkyl, or alkyl sulfonic acid will lead directly to the desired fluoro derivative in a single step and with good yields. The novel reaction is, therefore, unexpectedly suitable for the production of the above mentioned 21-fluoro-pregnane derivatives; it is further especially suitable for the preparation of novel compounds according to the present invention, such as 17α-(3-fluoro)-propenyl-Δ4-androstene-3β,17β-diol, the corresponding dihydroallo derivatives and the corresponding 19-nor compounds; the aforementioned compounds are useful pharmaceutical compounds, having minimal androgenic activity but exhibiting anti-androgenic and anti-estrogenic activity. The present invention is also directed towards the preparation of 17α-(3-fluoro)-propenyl-Δ4-androsten-17β-ol-3-one, the corresponding dihydroallo derivatives as well as the corresponding 19-nor-derivatives; these latter compounds are useful pharmaceutical compounds having minimal androgenic activity and exhibiting progestational and anabolic activity.

In practicing the novel process of the present invention, primary steroid alcohols, either alone or dissolved in a suitable organic solvent, are treated with between 1 to 5 moles, and preferably about 1.1 moles of an alkyl or aryl sulfonic acid fluoride, and preferably in the presence of between 2 to 10 molar equivalents of an alkaline metal fluoride. The reaction mixture is then allowed to react at temperatures ranging between 0° to about 150° C. and for a period of from 1 to 8 hours depending upon the nature of the treated compound; the fluorinated compound is then isolated and purified by conventional methods, such as crystallization, chromatography or the like.

The fluorides of an alkyl or aryl sulfonic acid may be prepared in a known manner, as described below, and may be derived from saturated or unsaturated aliphatic, cyclic or cyclic-aliphatic hydrocarbon radical of less than 20 carbon atoms. Typical examples of such hydrocarbon radicals are methyl, ethyl, isobutyl, palmitoyl, stearyl, benzyl, toluyl, xylyl, naphthyl and anthranyl.

Typical examples of the compounds that may be subjected to the novel reaction are such androstan and pregnane derivatives as, for example, Δ4-pregnen-21-ol-3,20-dione, Δ4-pregnene-17α,21-diol-20-one, cortexone, 17α-(3-hydroxy)-propinyl-Δ4-androsten-17β-ol-3-one, and the 19-nor-analogs of the aforesaid compounds.

"Cortexone" is used in this application for "desoxycorticosterone."

The novel compounds produced in accordance with the new process and having the above mentioned biological activities are represented by the following general formula:

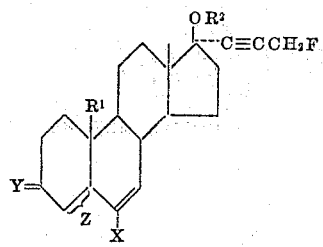

and

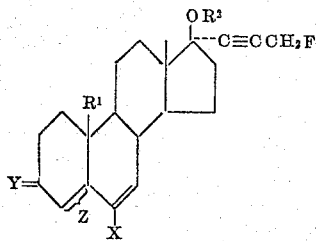

in which Z represents a carbon-to-carbon linkage selected from the group consisting of a double bond and a saturated linkage, X is a member of the group consisting of hydrogen, methyl, fluorine and chlorine; $R^1$ is a member of the group consisting of hydrogen and methyl; Y is a structural arrangement selected from the group consisting of =O $$\begin{matrix} OR^2 \\ H \end{matrix} \text{ and } \begin{matrix} H \\ OR^2 \end{matrix}$$

$R^2$ is a member of the group consisting of hydrogen and acyl radicals derived from hydrocarbon carboxylic acids having up to about 12 carbon atoms. The acyl radicals $R^2$ may be straight or branched chain, aliphatic, cyclic, cyclic-aliphatic, saturated or unsaturated and may be further substituted as, for example, by a halogen or a methoxyl group; typical examples of esters derived from such hydrocarbon carboxylic acids are the acetates, propionates, benzoates, β-chloropropionates, enanthates, undecenoates, trimethyl-acetates, hexanoates and phenylproprionates.

According to a particularly important feature in the process according to the invention, an aryl, araylkyl or alkyl sulfonyl fluoride in amounts of 1 to 4 mole equivalents, and preferably in an amount of 1.1 mole is added to one mole of the above described precursor compounds (I), for instance, a 17-ester of 17α-(3-hydroxy)-propenylandrostan-17β-ol-3-one and affords the corresponding 22-fluoro derivative.

The alkyl, aralkyl, or aryl sulfonyl fluorides are derived from alkyl, aralkyl, or aryl sulfonic acids in which the hydrocarbon part of the molecule contains less than 20 carbon atoms, and is either saturated or unsaturated, of straight or branched chain, and the alkyl part either open or cyclic or mixed open and cyclic. Typical examples of hydrocarbons from which the hydrocarbon portion of the above reagent can be derived, are methane, ethane, propane, hexadecane, octadecane, iso-pentane, cyclohexane, benzene, toluene, xylene, and naphthene.

In order to prepare the desired hydrocarbon sulfonyl fluoride, the respective acids, the aforesaid hydrocarbons, or the acid chlorides are treated in a known manner with potassium fluoride, or with fluorosulfonic acid, as described, for example, in Houbel-Weyl, "Methoden der Organischen Chemie," Vol. IX, pages 561–563, published by G. Thieme, Stuttgart, Germany, in 1955. The most easily accessible hydrocarbon sulfonyl fluorides are benzene sulfonylfluoride, tosyl fluoride and mesyl fluoride.

The new process according to the invention is carried out with an androstane or pregnane derivative of the type described above, as a starting material, which later is used either directly or preferably after being dissolved in an inert aromatic hydrocarbon solvent such as hexane, heptane, benzene or toluene, or esterified or etherified alcohols, such as dimethoxyglycol. Other suitable solvents are chloroform or nitromethane.

The new process according to the invention is illustrated in the reaction diagram given below and described in detail thereafter; $R^3$ in this diagram being a lower alkyl radical such as methyl, ethyl and the like.

nard reagent prepared from propargyl alcohol in accordance with the method described by Normant in "Bul. Soc. 1957, p. 1447, followed by the treatment of the resulting intermediate II with a dilute acid such as hydrochloric, sulfuric or perchloric acid, or an organic acid like p-toluenesulfonic acid, whereby the corresponding 17α-hydroxypropinyl-17β-hydroxy derivative III (i.e. 17α - (3 - hydroxy) - propinyl - Δ⁴ - androsten - 17β - ol-3-one) is obtained.

In the process as illustrated, compound III is esterified by treatment with acetic anhydride-acetic acid mixture in the presence of p-toluenesulfonic acid to yield the 17,22-diacetate of the 3-ketone. Partial saponification of the latter diacetate, for example with sodium methoxide in methanol at about 0° C. affords the 17-monoacetate V, in which the hydroxyl group at C–22 is now free. We have also found that the 17β-tertiary hydroxy group of compound III may be esterified by treatment with acetic anhydride in presence of perchloric acid to afford the same 17,22-diacetate.

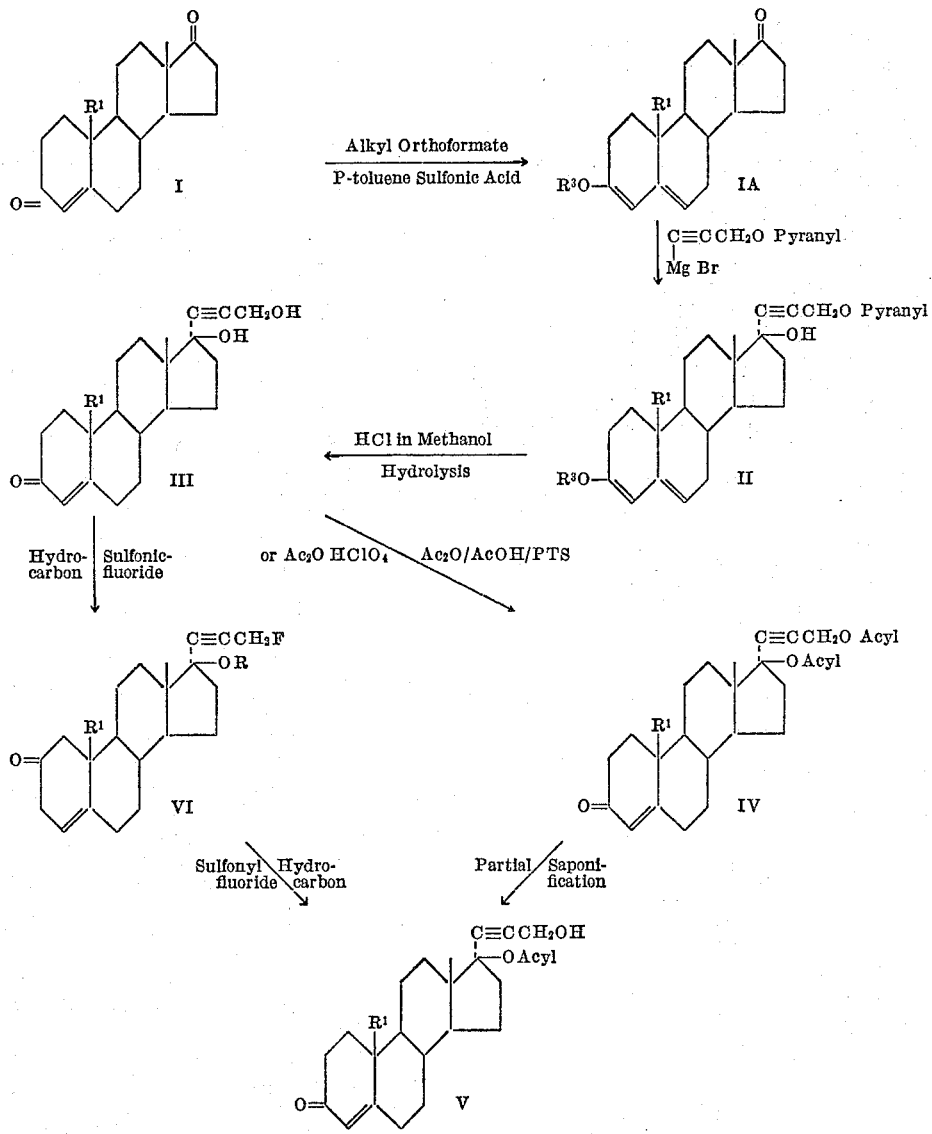

The above illustrated example of carrying out the process according to the invention comprises the treatment of a starting compound I, such as, for example, the 3-enolether of Δ⁴-androstane-3,17-dione or the 3-enolether of 19-nor-Δ⁴-androstane-3,17-dione with a Grignard reagent The precursor V is then refluxed in benzene solution with an aryl-, aralkyl-, or alkyl-sulfonyl fluoride, such as benzene sulfonyl fluoride, for instance for 6 hours, and thus affords 17α-(3-fluoro)-propinyl-Δ⁴-androsten- or 19-nor-Δ⁴-androsten-17β-ol-3-one (VI).

Alternatively, the intermediate III can be directly treated with an aryl-, aralkyl-, or alkyl-sulfonyl fluoride as set forth above, to give directly the compounds represented by Formula VI.

The intermediate III can be further treated by esterification for instance with acetic anhydride and pyridine, to obtain the corresponding 21-monoacetate. The latter compound shows a favorable ratio of androgen-anabolic activity and exhibits a high degree of suppression of pituitary activity. Its formula is:

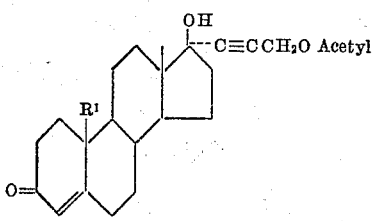

Of course, in carrying out the step from compound IV to V above, the formation of esters is not limited to the acetates alone but there may be produced other esters, diesters or mixed esters using in a known manner the anhydrides or chlorides of other hydrocarbon carboxylic acids of the type described above.

I have found that the treatment with aralkyl sulfonyl fluoride according to the invention is selective to primary hydroxyl groups and will not affect tertiary hydroxyls of the steroid molecule such as a 17β-hydroxyl group. It is, however, preferable to protect such tertiary groups by esterification since the yields on esterified compounds are higher.

The process can be carried out with other aralkyl sulfonyl fluorides, but since the most readily available commercial compounds are tosyl fluoride and benzene sulfonyl fluoride, the examples are limited to these two agents.

PREPARATION OF GRIGNARD REAGENT

To 5.5 g. of propargyl alcohol were added 100 cc. of benzene and 17 cc. of dihydropyrane, 40 cc. of benzene was distilled off, to insure anhydrous conditions and 300 mg. of p-toluenesulfonic acid were added. The mixture was kept at room temperature overnight. The benzene layer was extracted with dil. $NaHCO_3$ solution, washed with water dried over sodium sulfate and evaporated to dryness. The dihydropyranyl propargyl alcohol, thus obtained, was suspended under an atmosphere of nitrogen in 15 cc. of water containing 3 cc. of ethanol; 1.1 mole equivalents of potassium hypobromide in 15 cc. of water was added and the suspension was stirred at room temperature for 1½ hours. At the end of the reaction period the mixture was extracted with benzene, the benzene solution was dried with sodium sulfate and evaporated. The residue was dissolved under nitrogen atmosphere, in 60 cc. of anhydrous tetrahydrofurane, 1 mol equivalent of magnesium turnings, and 20 mg. of mercuric chloride were added, and the reaction mixture was heated to 60° and was maintained at this temperature for 1 hour. It was then cooled to +5° and diluted with an equal volume of dry ether.

*Example I*

1 g. of 19-nor-androstene-3,17-dione, is dissolved under stirring in 50 ml. of anhydrous dioxane, 1 ml. of ethylformate and 250 mg. of p-toluenesulfonic acid added, and the reaction mixture is allowed to stand during 3 hours at 25° C. It is then neutralized with pyridine, poured into ice-water, filtered, and washed with water containing a few drops of pyridine. The resulting precipitate is recrystallized from acetone-hexane. There is obtained the 3-ethylenol ether of 19-nor-Δ⁴-androstene-3,17-dione.

3.5 g. of the aforesaid 3-enol ether is dissolved in 80 cc. of dry ether and is added to 100 ml. of a Grignard solution obtained as described in the aforegoing preparation. The mixture is then allowed to stand at room temperature for 5 hours; it is then cooled to 0° and 25 cc. of a saturated solution of ammonium chloride is added. The formed organic layer is separated, washed with cold water and treated with 1 cc. of perchloric acid in 10 cc. of tetrahydrofurane. 50 cc. of ether is then added, the mixture is washed with sodium bicarbonate solution and then with water, and dried with sodium sulfate, and the solvent is evaporated. Crystallization from acetone-hexane affords the 17α-(3-hydroxy)-propinyl-19-nor-Δ⁴-androsten-17β-ol-3-one. 1.5 g. of the latter compound dissolved in 75 cc. of toluene is mixed with 2 g. of benzenesulfonyl fluoride, the mixture is heated to 80–90° C. for 4 hours. At the end of this reaction period, the mixture is cooled, poured into ice-water, the toluene solution is washed with sodium bicarbonate and then with water and dried over sodium sulfate and the solvent evaporated. Recrystallization of the residue from ether affords 17α-(3-fluoro)-propinyl-19-nor-Δ⁴-androsten-17β - ol - 3 - one, i.e. 17α-fluoro-propinyl-19-nor-testosterone.

*Example II*

1 g. of 17α-hydroxy-propinyl-19-nor-Δ⁴-androsten-17β-ol-3-one prepared as described in Example I, is dissolved in 40 ml. of dioxane, 2 g. of tosyl fluoride and 1.5 g. of potassium fluoride dissolved in 2 cc. of water are added, and the reaction mixture is maintained at 60–65° C. for 6 hours. Subsequent separation and purification as described in Example I yield 17α-fluoropropinyl-19-nor-testosterone identical to the compound obtained in accordance with Example I.

*Example III*

A solution of 1 g. of 17α-hydroxy propinyl-19-nor-Δ⁴-androsten-17β-ol-3-one, prepared as described in Example I, in 50 cc. of ethyl acetate containing 0.01 mol of perchloric acid was cooled to 10° C. and treated with 3 cc. of acetic anhydride. The reaction mixture was allowed to stand at this temperature for 10 minutes, was diluted with water, the organic layer was separated, washed with 5% aqueous sodium bicarbonate solution and water, dried over anhydrous sodium sulfate and evaporated to dryness. Crystallization from ether gave the crystalline 17α-(3-acetoxy)-propinyl-19-nor-Δ⁴-androsten-17β-ol-3-one 17-acetate.

500 mg. of the above last mentioned compound was suspended in 20 cc. of methanol, in which 70 mg. of sodium have been dissolved, under a stream of nitrogen, the reaction mixture was stirred for 1 hour at 0° C., neutralized with acetic acid and poured into ice water; the precipitate was collected and recrystallized from acetone-ether, thus yielding 17α-(3-hydroxy)-propinyl-19-nor-testosterone-17β-acetate. By following the procedure of Example I or II, 350 mg. of the latter compound were converted into 17α-fluoro-propinyl-19-nor-testosterone-acetate by treatment with tosyl fluoride or benzenesulfonyl fluoride respectively.

*Example IV*

In accordance with the method of Example I, 5 g. of 6α-methyl-Δ⁴-androsten-3,17-dione was converted into 17α-(3-fluoro)-propinyl-6α-methyl-testosterone. 2 g. of this compound were dehydrogenated with chloranil, by the method disclosed by Agnello and Laubach in U.S. Patent No. 2,891,079 to the corresponding 17α-(3-fluoro)-propinyl-6-methyl-Δ⁶-dehydro-testosterone. A mixture of 1 g. of the last mentioned compound, 40 cc. of acetic acid, 20 cc. of acetic anhydride and 1 g. of p-toluenesulfonic acid was allowed to stand at room temperature for 1 hour; the resulting reddish solution was poured into ice water and stirred for 30 minutes to effect complete hydrolysis of the excess of acetic anhydride, there was then extracted three times with ethyl acetate, washed with 5% aqueous sodium bicarbonate solution and water until neutral, dried over anhydrous sodium sulfate and evaporated to dryness under reduced pressure. Crystallization from methylene chloride-ether afforded 17α-(3-fluoro)-propinyl-6-methyl-6-dehydro testosterone acetate.

The starting material, 6α-methyl-Δ⁴-androsten-3,17-dione was obtained from the 3,17-bis-ethylene ketal of testosterone by the method described by Spero et al. in J. Am. Chem. Soc. 78, 6213 (1956).

*Example V*

By following the procedure of Example I, 6α-fluoro-Δ⁴-androsten-3,17-dione, described by Bowers et al. in Tetrahedron, 1958, vol. 3, pp. 14–27, was converted into 17α-(3-fluoro)-propinyl - 6α - fluoro-Δ⁴-androsten-17β-ol-3-one. Upon acetylation of this compound, by the method described in Example III, the corresponding 17-acetate of 17α-(3-fluoro)-propinyl-6α-fluoro-testosterone was obtained.

*Example VI*

By the same method as described in Example I, androstan-17β-ol-3-one was converted into 17α-(3-fluoro)-propinyl-androstan-17β-ol-3-one.

*Example VII*

1.5 g. of cortexone (desoxycorticosterone) dissolved in 15 cc. of benzene is mixed with 2 g. of benzenesulfonylfluoride, and the mixture is heated to 80° C. on a steam bath for 3 hours; it is then cooled, 40 cc. of cold water were added and the resulting benzene layer is separated, washed with diluted sodium bicarbonate solution, water and dried over sodium sulfate. Evaporation of the solvent under reduced pressure and crystallization of the residue from acetone-hexane yields 21-fluoro-progesterone, identical with an authentic specimen.

*Example VIII*

By the same method as described in the above example, but substituting 19-nor-cortexone for cortexone there is produced 21-fluoro-19-nor-progesterone.

I claim:
1. A process for substituting fluorine for a primary hydroxyl group in a steroid alcohol comprising reacting a steroid alcohol selected from the group consisting of a C-21 primary alcohol of the pregnane series and a 17α-(3-hydroxy)-propinyl derivative of the androstane series with a fluorinating agent selected from the group consisting of aryl, aralkyl and alkyl sulfonyl fluorides and isolating the resulting fluoro-steroid derivative in which the primary hydroxyl group has been replaced by fluorine.

2. A process as described in claim 1, characterized in that the reaction between the steroid alcohol and the fluorinating agent is carried out in an inert solvent for the reactants, which solvent is selected from the group consisting of liquid aliphatic and aromatic unsubstituted, halogenated, and nitrated hydrocarbons.

3. A process as described in claim 2, characterized in that the solvent is benzene.

4. A process as described in claim 2, characterized in that the solvent is toluene.

5. A process as described in claim 1, characterized in that the fluorinating agent is benzene sulfonyl fluoride.

6. A process as described in claim 1, characterized in that the fluorinating agent is tosyl fluoride.

7. A process as described in claim 1, characterized in that an admixture of an alkaline metal fluoride in amounts of from about 1 to 10 molar equivalents for every molar equivalent to steroid alcohol to be treated is added to the reactants.

8. A process as described in claim 7, characterized in that the alkaline metal fluoride is potassium fluoride.

9. A process as described in claim 1, characterized in that from about 1 to 5 molar equivalents of the fluorinating agent are used for every molar equivalent of the steroid alcohol.

10. A process as described in claim 1, characterized in that the reactants are allowed to react with each other at a temperature in the range from 0° to 150° C. for a period of from about one to eight hours.

11. A process as described in claim 1, characterized in that the fluorinating agent is benzene sulfonyl fluoride, that at least one molar equivalent of potassium fluoride is added to the reactants per molar equivalent of steroid alcohol, and that the resulting reaction mixture is heated to 80° to 90° C.

12. A process as described in claim 1, characterized in that the reaction between the steroid alcohol and the fluorinating agent is carried out in dioxane.

13. A compound corresponding to the general formula:

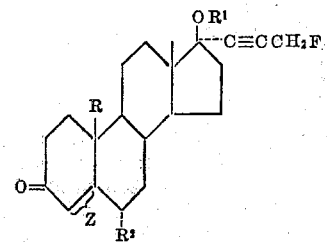

wherein Z is selected from the group consisting of a double bond and a saturated linkage, R is selected from the group consisting of hydrogen and methyl, $R^1$ is selected from the group consisting of hydrogen and the acyl radical of a hydrocarbon carboxylic acid having up to 12 carbon atoms, and $R^2$ is selected from the group consisting of hydrogen and methyl.

14. A compound corresponding to the general formula:

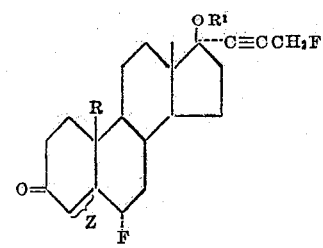

wherein Z is selected from the group consisting of a double bond and a saturated linkage, R is selected from the group consisting of hydrogen and methyl, and $R^1$ is selected from the group consisting of hydrogen and the acyl radical of a hydrocarbon carboxylic acid having up to 12 carbon atoms.

15. A compound corresponding to the general formula:

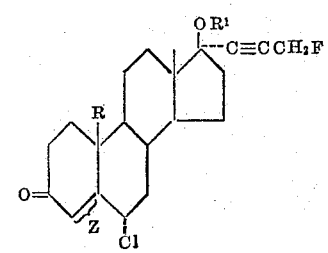

wherein Z is selected from the group consisting of a double bond and a saturated linkage, R is selected from the group consisting of hydrogen and methyl and $R^1$ is selected from the group consisting of hydrogen and the acyl radical of a hydrocarbon carboxylic acid having up to 12 carbon atoms.

References Cited in the file of this patent

Barton et al.: "Journal of the Chemical Society (1957), pages 5094–5 relied on.